June 30, 1970 C. M. HART ET AL 3,518,438
CIRCUIT FOR PHOTOMETERS AND THE LIKE HAVING SENSING AND COMPENSATING DIODES AND UTILIZING POTENTIOMETER FOR SETTING THE CONSTANT OF PROPORTIONALITY BETWEEN THE LIGHT INTENSITY AND THE OUTPUT CURRENT
Filed May 22, 1968
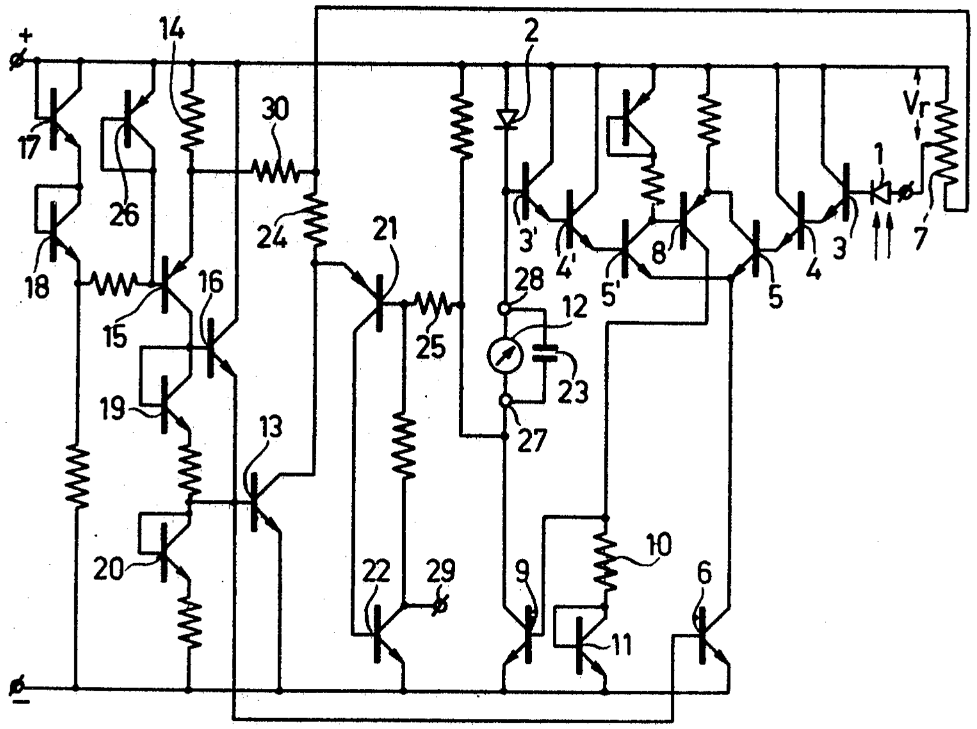
INVENTORS
CORNELIS M. HART
ARIE SLOB
BY
[signature]
AGENT United States Patent Office 3,518,438

Patented June 30, 1970

3,518,438

CIRCUIT FOR PHOTOMETERS AND THE LIKE HAVING SENSING AND COMPENSATING DIODES AND UTILIZING POTENTIOMETER FOR SETTING THE CONSTANT OF PROPORTIONALITY BETWEEN THE LIGHT INTENSITY AND THE OUTPUT CURRENT

Cornelis Maria Hart and Arie Slob, Emmasingel, Eindhoven, Netherlands, assignors, by mesne assignments, to U.S. Philips Corporation, New York, N.Y., a corporation of Delaware Filed May 22, 1968, Ser. No. 731,126
Claims priority, application Netherlands, June 21, 1967, 6708603
Int. Cl. H01j *39/12;* G01j *1/42;* G03b *7/02*
U.S. Cl. 250—211 3 Claims

ABSTRACT OF THE DISCLOSURE

A device employing a light sensitive diode providing a logarithmic indication of light level, a reference diode, and a difference amplifier receiving the currents from each diode for supplying a light dependent current output.

The invention relates to a photosensitive device having a photodiode which is coupled with an amplifier supplying an electric current dependent upon the radiation intensity on the photodiode.

An object of the invention is to provide a device which can be incorporated in photographic apparatus as an exposure meter or for the automatic exposure adjustment. The device according to the invention utilizes semiconductor amplifiers or the photo-sensitivity of semiconductor elements which are suitable to be constructed entirely or for the major part as an integrated circuit. With such uses, different factors should be taken into account, such as the influence of fluctuations of the ambient temperature, of the supply voltage etc., whilst a simple commutation to different measuring ranges is also desirable.

The invention starts from the fact that with an unloaded photocell, especially the voltage produced across a pn-semiconductor diodes increases with the logarithm of the incident light intensity. The invention is characterized in that the voltage across the photodiode, preferably increased by an adjustable direct voltage, is applied to one input terminal of a difference amplifier, whilst the voltage across a reference diode is applied to the other input terminal of this difference amplifier, which amplifier produces the desired output current which is also supplied to the said reference diode.

The invention is based on recognition of the fact that the voltage produced across the reference diode also varies with the logarithm of the current flowing through this reference diode and that it can be ensured that the two proportionality constants are equal. The difference amplifier produces a current such that the voltage across this reference diode becomes equal to the voltage across the photodiode, as the case may be, increased by an adjustable direct voltage. In this case, the current through the reference diode and hence also the output current varies exponentially with the voltage across this diode and hence with the voltage across the photodiode, as the case may be, increased by the adjustable direct voltage, and hence proportionally to the light intensity, the proportionality constant still being determined by the adjustable direct voltage.

The invention will be described with reference to the drawing, which shows an embodiment of the invention.

The device according to the invention includes a photosensitive diode (photodiode) 1, more particularly of the semiconductor pn-type, across which is produced a voltage $V_1$ proportional to the logarithm of the light intensity I, further a reference diode 2 across which is produced a voltage $V_2$ proportional to the logarithm of the current *i* flowing through it, and a difference amplifier comprising transistors 3, 3′, 4, 4′, 5, 5′ and 6, which latter transistor acts as a high differential or alternating current-resistance with a low direct voltage drop in the common emitter circuit of the transistors 3, 4, 5 and 3′, 4′, 5′, respectively, connected as emitter followers. This mode of connection results in a high internal resistance at the base inputs of the transistors 3 and 3′, respectively, so that the voltage produced across the diodes 1 and 2, respectively, need supply hardly any currents to the transistors 3 and 3′, respectively. Furthermore, an adjustable stabilized direct voltage $V_r$ originating from an adjusting potentiometer 7 is applied in series with the voltage across the diode 1 to the base of transistor 3. The output of the difference amplifier controls a transistor 8 followed by a transistor 9 with temperature compensation by means of a resistor 10 and a transistor 11 connected as a diode, the current of the transistor 9 flowing through the series-combination of an indicator instrument 12 and the reference diode 2.

If the voltage across the photodiode 1 is chosen to be equal to $V_1$, the reference voltage at the tapping on the potentiometer 7 equal to $V_r$ and the voltage across the diode 2 equal to $V_2$, the difference amplifier 3, 4, 5, 3′, 4′, 5′ will control the transistors 8, 9 so that practically $$V_1+V_r=V_2$$

Since $V_1=c_1$, log I and $V_2=c_2 \log i$, where I represents the light intensity on the photodiode 1 and *i* the current through the reference diode 2, it holds therefore that:

$$c_1 \log I+V_r=c_2 \log i$$

In practice, the proportionality constants $c_1$ and $c_2$ can be made substantially equal. If $V_r$ is replaced by $c_2 \log c$, it holds therefore for the current *i* through the diode 2 and hence through the indicator instrument 12 that:

$$i=cI$$

The proportionality constant *c* can therefore be adjusted to arbitrary values by means of the potentiometer 7, the proportionality between the current *i* through the indicator instrument 12 and the incident light intensity I otherwise exhibiting a high degree of linearity under various operating conditions, such as variations in supply voltage and in temperature.

Since the adjustable voltage $V_r$ directly influences the indication of the instrument 12, the current through the potentiometer 7 should be stabilized to a large extent. This current originates from a transistor 13 which produces across a resistor 14 in the emitter circuit of a transistor 15 a voltage which is compared with the voltage across a transistor 26 connected as a comparison diode so that variations of the voltage produced by the transistor 13 across the resistor 14 give rise to corresponding variations of the current through the transistor 15 which, after being amplified in the transistor 16, have such a reaction on the input circuit of the transistor 13 that its collector current is stabilized. The transistors 17, 18, 19 and 20 connected as diodes serve to produce suitable direct voltages for the control and the temperature compensation of the various transistors. The base of transistor 13 is also connected to the base of transistor 6 so that the current through this transistor is also stabilized, which favourably influence the operation of the difference amplifier.

In order to permit of reading the exposure intensity, the adjustable contact of the potentiometer 7 is displayed so that the indicator instrument 12 invariably indicates the same current strength. A linear potentiometer 7 then provides a direct indication for the logarithm of the exposure intensity I, in other words, the (linear) potentiometer 7 can be linearly calibrated in light values (1 light value corresponds to an increase in light intensity by a factor 2). Due to the fact that the voltage across the potentiometer 7 is derived from the voltage across the resistor 14 which in turn is equal to the difference between the voltage across the transistor 26 and the emitter-base voltage of the transistor 15, the temperature dependence of the diode 2 is compensated for by that of the last-mentioned voltages.

By means of the transistors 21 and 22 connected has a trigger circuit, a blocking can be obtained with respect to over- and under-exposure. In the case of over-exposure, for example, such a high voltage will be produced across the series-combination of the diode 2 and the indicator instrument 12, which may be replaced by a resistor, that the transistor 21 becomes conducting and that the transistor 22 also acts as a trigger circuit. The current of transistor 22 is used to energize an alarm lamp connected, for example, to a terminal 29 or a miniature relay blocking the shutter. In a similar manner, a blocking with respect to under-exposure can be obtained in that a permanently conducting trigger is rendered inopertaive by the voltage at the terminal 27. The trigger 21, 22 may also act as an automatic electronic shutter. In this case, the indicator instrument 12 between the points 27 and 28 is replaced by a capacitor 23. When the shutter is opened, the capacitor 23 is shortcircuited, which shortcircuit is eliminated when the shutter is released. The trigger 21, 22 is now adjusted by means of the resistor 24 so that the transistors 21, 22 become conducting after a delay time which is determined on the one hand by the voltage across the resistors 24, 30 and 14 and on the other hand by the current *i* through the diode 2 and the capacitor 23. The current through the transistors 21, 22 can in turn energize an electromagnet by means of which the shutter is closed.

What is claimed is:

1. A photosensitive device comprising a photodiode producing a first voltage proportional to the intensity of radiation incident thereon, a reference diode producing a second voltage proportional to the current flowing therein, a difference amplifier, means including said first voltage being applied to a first input of said difference amplifier, means including said second voltage being applied to a second input of said difference amplifier, said amplifier producing an output current proportional to the difference between said first and second inputs, and means applying said output current to said reference diode, said output current being proportional to intensity of radiation incident upon said photodiode.

2. The combination of claim 1 further including an additional adjustable direct voltage means connected in series with said photodiode for forming said first difference amplifier input, said additional adjustable direct voltage means having a temperature coefficient compensating for said reference diode voltage.

3. The combination of claim 2 wherein the said adjustable direct voltage means comprises a potentiometer, means for producing a stabilized current level, means coupling said stabilized current to said potentiometer.

References Cited

UNITED STATES PATENTS

| | | | |
|---|---|---|---|
| 2,987,957 | 6/1961 | Lovegrove | 356—226 |
| 3,333,106 | 7/1967 | Fischer | 250—214 |
| 3,435,328 | 3/1969 | Allen | 250—212 X |

RALPH G. NELSON, Primary Examiner

T. N. GRIGSBY, Assistant Examiner

U.S. Cl. X.R.

250—212, 214; 356—223, 226